J. P. GERAGHTY.
LOCKING DEVICE FOR AUTOMOBILES.
APPLICATION FILED NOV. 18, 1920.

1,421,684.

Patented July 4, 1922.
2 SHEETS—SHEET 1.

WITNESSES

INVENTOR
JOHN P. GERAGHTY
BY
ATTORNEYS

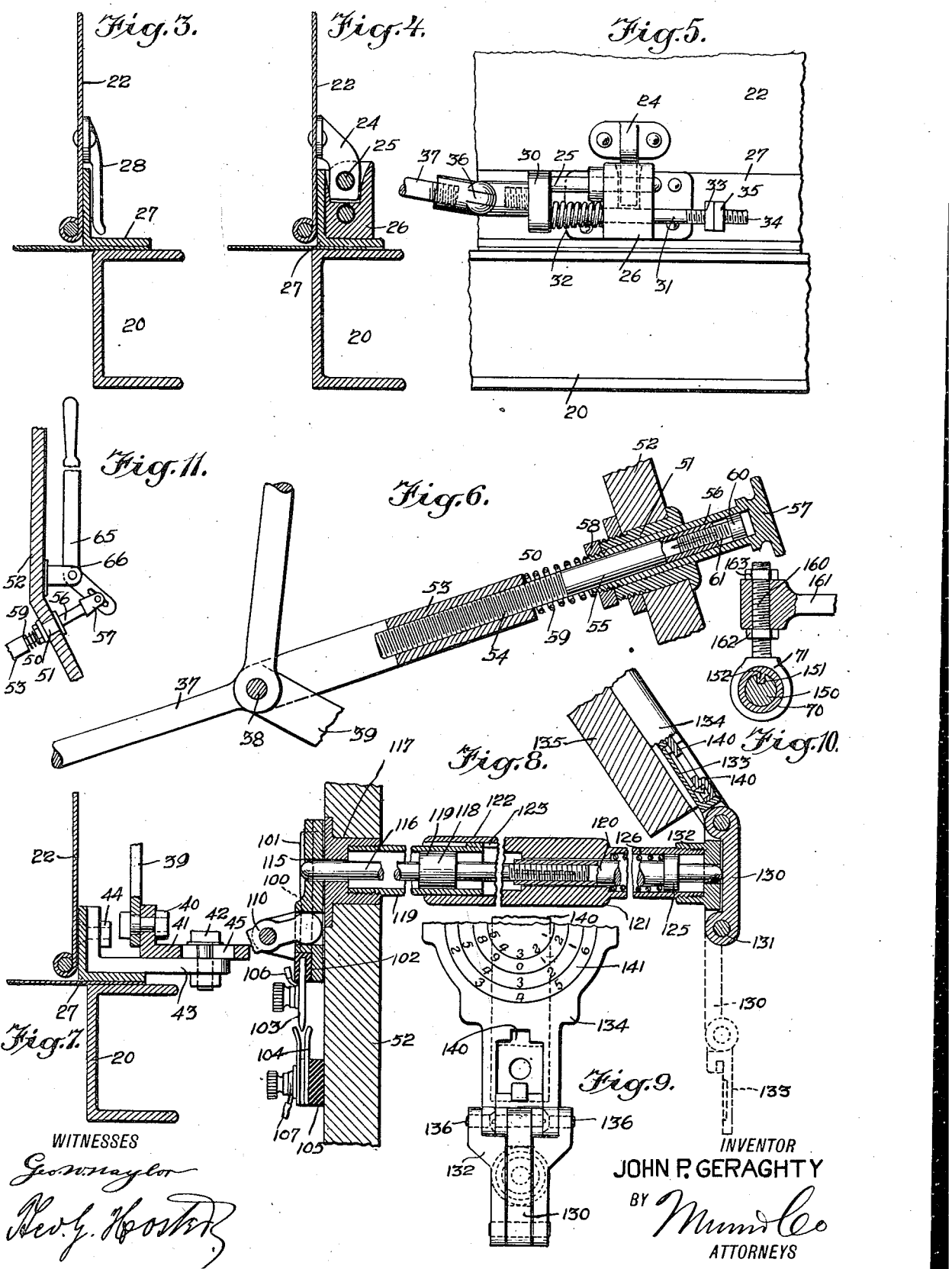

UNITED STATES PATENT OFFICE.

JOHN P. GERAGHTY, OF JERSEY CITY, NEW JERSEY.

LOCKING DEVICE FOR AUTOMOBILES.

1,421,684.  Specification of Letters Patent.  Patented July 4, 1922.

Application filed November 18, 1920. Serial No. 424,937.

*To all whom it may concern:*

Be it known that I, JOHN P. GERAGHTY, a citizen of the United States, and a resident of Jersey City, in the county of Hudson and State of New Jersey, have invented a new and Improved Locking Device for Automobiles, of which the following is a full, clear, and exact description.

The invention relates to locking devices for automobiles, such as shown and described in the Letters Patent of the United States, No. 1,343,049, granted to me on June 8, 1920.

The object of the present invention is to provide a new and improved locking device for automobiles and similar power driven vehicles, and arranged to prevent unauthorized persons from starting and running the motor thereby preventing such persons from stealing the vehicle.

Another object is to permit of readily applying the locking device to different types of automobiles.

Another object is to enable the attendant in charge of the vehicle to readily manipulate the locking device for locking and unlocking the same.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 3 is an enlarged cross section of the hood and chassis and showing one of the locking catches for the hood;

Figure 4 is a similar view of one of the hood locking devices;

Figure 5 is a side elevation of the same;

Figure 6 is an enlarged sectional side elevation of the operating means controlled by the attendant in charge of the vehicle;

Figure 7 is an enlarged cross section of the adjustable mounting for the link mechanism;

Figure 8 is an enlarged sectional side elevation of the permutation lock for locking the several devices when in operative position;

Figure 9 is a face view of the same;

Figure 10 is an enlarged sectional side elevation of one of the bearings for the sectional rock shaft; and Figure 11 is a side elevation of a hand-controlled operating mechanism for the locking device, the dashboard being shown in section.

Figure 1:
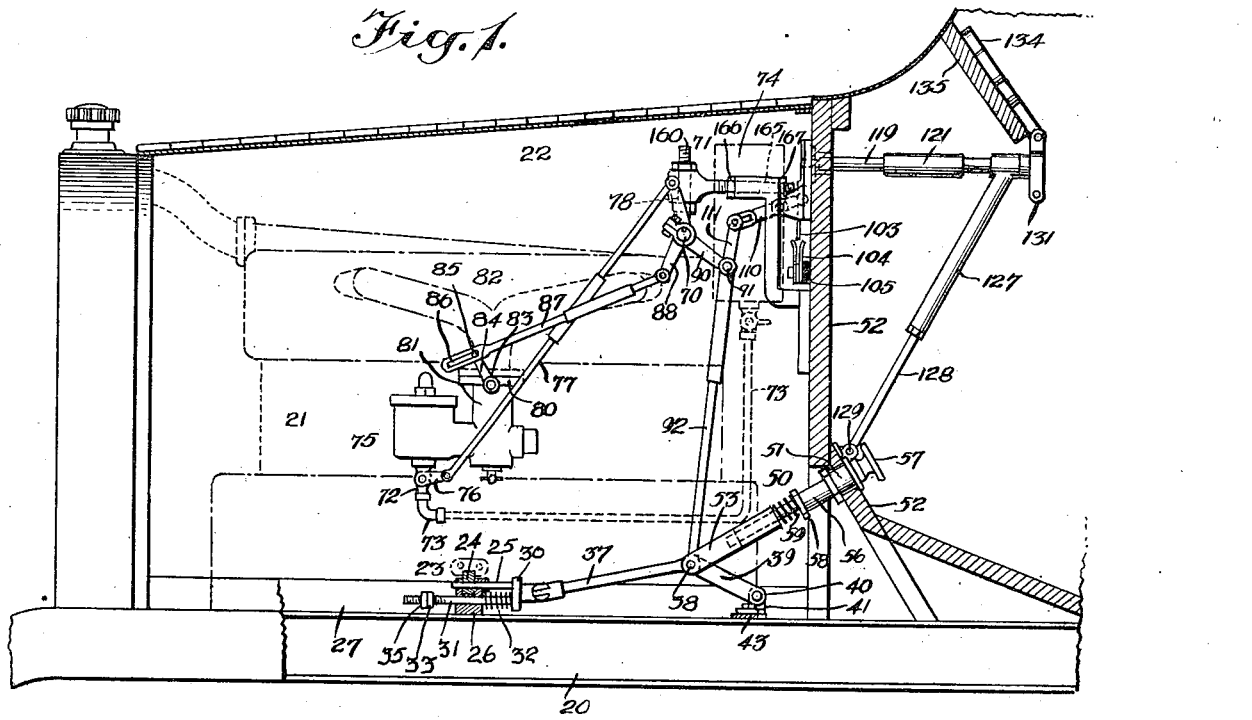
Figure 1 is a longitudinal sectional side elevation of the forward end of an automobile provided with the improved locking device, the motor being shown in dotted lines, the section being taken on the line 1—1 of Figure 2.

On the chassis 20 of an automobile or other vehicle is mounted the usual motor 21 enclosed within a hood 22 adapted to be locked to the chassis by interior locking devices 23, preferably one on each side as shown in Figures 1, 2, 3, 4 and 5, but alike in construction so that it suffices to describe but one in detail. On the inner face of the hood 22 is secured a keeper 24 adapted to be engaged by a bolt 25 mounted to slide in a guideway 26 attached to an angle iron 27 secured to the chassis 20 and extending lengthwise on the inner face of the corresponding side of the hood 22 thus forming an abutment for the corresponding side of the hood, as will be readily understood by reference to Figures 3, 4 and 5. In order to hold the corresponding side of the hood 22 against outward movement use is made of catches 28 riveted or otherwise secured to the inner face of each side of the hood 22 and adapted to straddle the vertical member of the corresponding angle iron 27 (see Figure 3. The bolt 25 is provided with a head 30 having a rod 31 parallel to the bolt 25 and mounted to slide in the bearing 26, and on this rod 31 is coiled a spring 32 interposed between the bearing 26 and the head 30 to normally hold the bolt 25 out of engagement with the keeper 24. The sliding movement of the rod 31 is limited by a nut 33 screwing on the threaded end 34 of the rod 31. The nut 33 is adapted to abut against the bearing 26 at the time the bolt 25 is out of engagement with the keeper 24. A jam nut 35 screwing on the threaded end 34 of the rod 31 serves to lock the stop nut 33 in the adjusted position. The head 30 of the bolt 25 is connected by a universal joint 36 with a rod 37 pivotally connected with a pivot 38 held on a link 39 mounted to swing on a pivot 40 held on a bracket 41 adjustably secured by a bolt 42 to a bracket 43 fastened by bolts or other fastening devices 44 to the corresponding angle iron 27. The bolt 42 extends through an elongated slot 45 formed in the bracket 41 to allow of adjusting the latter transversely on the bracket 43 to move the link 39 into the desired position. The pivot 38 of the left-hand locking device for the hood 22 is pivotally connected with a rod 50 mounted to slide in a bearing 51 attached to the dashboard 52. The rod 50 is provided with an inner section 53 pivotally connected with the pivot 38, and in this section 53 screws the threaded end 54 of a section 55 on which is mounted to slide a tubular section 56 mounted to slide in the bearing 51 and terminating in a head 57 adapted to be pressed by the foot of the operator in charge of the automobile. A nut 58 screws on the inner end of the screw 56 and normally abuts against the inner end of the bearing 51. A spring 59 is interposed between the nut 58 and the section 53 to provide a yielding connection between the sections 55, 56. Thus when the operator presses the head 57 with the foot the spring 59 is compressed but compression is limited by the head 60 of a screw 61, screwing in the end of the section 55 and against which is adapted to abut the head 57 (see Figure 6).

Instead of actuating the rod 50 by foot use may be made of a hand-controlled lever 65 (see Figure 11) fulcrumed on a bracket 66 attached to the dashboard 52. The lever 65 is pivotally connected with the head 57 of the rod 50 and hence when the lever 65 is swung rearward by the operator in charge of the automobile the rod 50 is pushed forward the same as if the head 57 were pushed forward by the foot of the operator.

Within the hood 22 and in the upper rear portion thereof is arranged an extensible rock shaft 70 journaled in adjustable bearings 71 attached to the forward face of the dashboard 52. The rock shaft 70 controls a plurality of devices connected with different members of the motor 21 for rendering the latter inoperative by each of the said devices. As shown in the drawings, use is made of a shut-off valve 72 arranged in the pipe 73 connecting the reservoir 74 with the carbureter 75 of the motor 21, it being understood that this valve 72 is normally in open position but is moved into closed position whenever the operator presses the rod 50 in a forward direction. It is understood that when the valve 72 is closed the supply of the motor fuel is cut off and hence the motor cannot be run. The valve 72 is provided with an arm 76 connected by a sectional link 77 with an arm 78 secured on the rock shaft 70 and hence when the latter is rocked on moving the rod 50 forward then the valve 72 is moved into closed position for the purpose mentioned.

A butterfly valve 80 arranged in the pipe 81 connecting the carbureter 75 with the intake manifold 82 of the motor 21 is provided with a rock shaft 83, on one outer end of which is secured the usual arm connected with the usual controlling mechanism under the control of the operator for moving the butterfly valve 80 into open or closed position. On the other end of the rock shaft 83 is secured an arm 84 provided with a pin 85 engaging a slot 86 formed in the free end of a sectional link 87 pivotally connected with an arm 88 attached to the rock shaft 70. It will be noticed that the butterfly valve 80 can be readily moved into open and closed position by the operator actuating the usual controlling mechanism without interfering with the link 87, but when the rock shaft 70 is actuated after the motor is stopped then the butterfly valve 80 moves into closed position by the action of the link 87 engaging the arm 84 thus preventing the motor 21 from being started and run.

Figure 2:
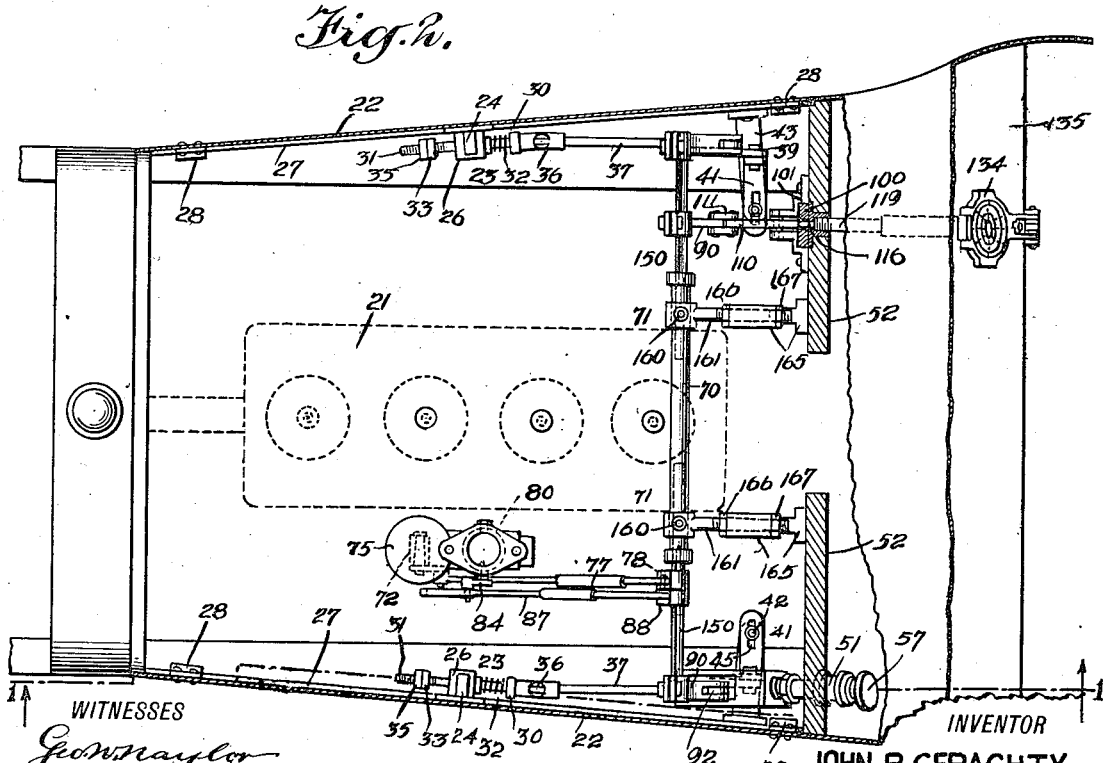
Figure 2 is a sectional plan view of the same with parts broken out.

The rock shaft 70 is actuated from the rod 50 and for this purpose the rock shaft 70 is provided with arms 90 each pivotally connected with a pivot 91 connected by a link 92 with the pivot 38 and hence when the rod 50 is moved inward a rocking movement is given to the rock shaft 70 by the links 92 and the arms 90. It is understood that by the connection just described but one rod 50 is needed for actuating the two hood locking devices 23, the rod 50 being preferably located on the left-hand side of the machine, as illustrated in Figure 2.

Another device in the form of a switch is arranged within the hood 22 for breaking the ignition circuit of the motor 21 thus rendering the latter inoperative. For this purpose use is made of a slide 100 mounted to slide up and down in a bearing 101 attached to the forward face of the dashboard 52. On this slide 100 is secured a switch bar 102 of an insulating material and carrying a contact 103 adapted to engage a pair of contacts 104 secured on a bar 105 of insulating material and secured to the forward face of the dashboard 52. The contacts 103 and 104 are connected by wires 106 and 107 with the spark plugs and the timer of the ignition system of the motor 21. Normally the contacts 103 and 104 are in engagement with each other to complete the circuit of the ignition system but when the rod 50 is moved forward and the hood locking device is moved into closed position and the valves 72 and 80 are moved into inoperative positions then the contact 103 is moved out of engagement with the contact 104 to break the circuit of the ignition system. In order to do so the slide 100 is moved upward and this slide is connected with one end of a lever 110 fulcrumed on the bearing 101 and pivotally connected by a link 111 with the pivot 91 on the right-hand side of the machine. Thus when the rock shaft 70 is actuated an upward drawing movement is given to the slide 100.

The slide 100 (see Figure 8) is provided with an aperture 115 adapted to be engaged by a bolt 116 mounted to slide at its forward end in a bearing 117 attached to the dashboard 52. The bolt 116 is provided with an enlarged portion 118 mounted to slide in a tubular bearing 119 screwed or otherwise secured to the bearing 117. The forward end of the bolt 116 is threaded into an extension bolt 120 mounted to slide in a bearing 121 adjustably mounted on the bearing 119, the latter having a key 122 engaging a keyway 123 formed in the bearing 121. In the rear end of the bolt 120 is formed a collar 125 pressed on by a spring 126 coiled around the extension bolt 120 and seated on the bearing 121. The spring 126 tends to move the connected bolts 116 and 120 in a forward direction, that is, the bolt 116 out of engagement with the aperture 115. A brace 127 is connected with the rear end of the bearing 121 and this brace 127 is provided with an extension brace 128 pivotally connected at 129 with the dashboard 52 to hold the bearing 121 in proper position.

In order to hold the bolts 120 and 116 in locking position, the valves 72 and 80 in closed position, the bolts 25 in locking position, the contact 103 in circuit breaking position, and the rod 50 in forward position, use is made of a locking device adapted to hold the bolts 120 and 116 in locking position relative to the slide 100. For this purpose the rear end of the extension bolt 120 is engaged by a locking arm 130 pivotally connected at its lower end by a pivot 131 with a cap piece 132 forming part of the bearing 121 by being screwed thereon. The upper end of the locking arm 130 is pivotally connected with a locking arm 133 adapted to engage a frame 134 secured to the instrument board 135 of the automobile. The lower end of this frame 134 is pivotally connected at 136 with the cap piece 132 to allow the frame 134 to fit differently inclined instrument boards 135 of different makes of automobiles. The frame 134 and the arm 133 form parts of a permutation lock of any approved construction but preferably of the construction more fully shown and described in the Letters Patent of the United States No. 1,343,048, granted to me on June 8, 1920. The permutation lock is provided with a locking slide 140 adapted to engage the arm 133 to lock the latter in closed position, and the said locking slide 140 is controlled by tumblers 141 mounted to turn on the frame 134 and provided with the usual letters, numerals or other characters (see Figure 9) to permit of setting the tumblers to any desired combination and which combination is known only to the operator in charge of the vehicle, and hence unauthorized persons cannot open the lock and release the arm 132 and consequently the locking arm 130. When the operator in charge desires to start the vehicle he sets the tumblers 141 to the predetermined combination thus unlocking the slide 140 to release the arm 133 thereby allowing the latter and the arm 130 to swing downward into unlocking position, indicated in dotted lines in Figure 10, and when the arm 132 moves into this position it unlocks the connected bolts 116 and 120 and the same move rearward by the action of the spring 126, and when this takes place the forward end of the bolt 116 moves out of the aperture 115 thus releasing or unlocking the slide 100. When this takes place, the several parts within the hood return to normal positions by the actions of the springs 32 and 59. It is understood that when this takes place the hood 22 is unlocked, the valves 72 and 80 move into open position, the contact 103 moves into engagement with the contact 104 thus closing the ignition circuits, and the rod 50 returns to normal rearward position.

In order to permit of using the locking device for different types of automobiles, the rock shaft 70 is preferably provided with telescoping side extensions 150 having keyways 151 (see Figure 10) engaging keys 152 formed on the shaft 70. The extensions 150 carry the several arms 78, 88 and 90. The bearings 71 for the shaft 70 are made adjustable and for this purpose each bearing is provided with a screw rod 160 (see Figure 10) held adjustable in an arm 161 by nuts 162 and 163. The arm 161 is held adjustable in a bracket 165 by the use of nuts 166 and 167, and the bracket 165 is attached to the forward face of the dashboard 52. It will be noticed that by the arrangement described the rock shaft 70 can be adjusted up or down, forward or backward, to suit conditions.

Having thus described my invention, I claim as new and desire to secure by Letters Patent:—

1. In a motor driven vehicle, a motor, a hood inclosing the motor, a locking device within the hood for locking the latter, a plurality of motor controlling devices arranged within the hood and mounted with different members of the motor for rendering the latter ineffective, a rock shaft within the hood and connected with the said motor controlling devices, an operating means controlled by an operator and connected with the said shaft and with the said hood locking device, and locking means controlled by an operator and connected with the said shaft and said operating means to lock the shaft and operating means against movement after the hood locking device and the said plurality of motor controlling devices have been moved into operative position by the said operating means.

2. In a motor driven vehicle, a motor, a hood inclosing the motor, a locking device within the hood for locking the latter, a plurality of motor controlling devices arranged within the hood and connected with different members of the motor for rendering the latter ineffective, a rock shaft within the hood and connected with the said motor controlling devices, an operating means controlled by an operator, links connecting the said operating means with the said rock shaft and with the said hood locking device, and locking means controlled by an operator and connected with the said links to lock the shaft and the operating means against movement after the hood locking device and the said plurality of motor controlling devices have been moved into operative position.

3. In a motor driven vehicle, a motor, a hood inclosing the motor, a locking device within the hood for locking the latter, a plurality of motor controlling devices arranged within the hood and connected with different members of the motor for rendering the latter ineffective, a rock shaft within the hood and connected with the said motor controlling devices, the said rock shaft being extensible and located in the upper portion of the hood above the motor, adjustable bearings mounted in the hood and in which the said rock shaft is mounted, an operating means controlled by an operator and connected with the said shaft and with the said hood locking device, and locking means controlled by an operator and connected with the said shaft and the said operating means to lock the shaft and operating means against movement after the hood locking device and the said plurlity of motor controlling devices have been moved into operative position by the said operating means.

4. In a motor driven vehicle, a motor, a hood enclosing the motor, fixed angle irons against which fit the lower ends of the sides of the said hood, catches fixed interiorly on the sides of the hood and extending over the angle irons, hood locking devices within the said hood, one for each side thereof to lock the hood in closed position, each of the said locking devices having a bolt, a bearing for the bolt and attached to the angle iron, a keeper on the corresponding side of the hood and in which the bolt is mounted to slide, and operating means controlled by an operator and connected with the bolts of the said hood locking devices.

5. In a motor driven vehicle, a motor, a hood enclosing the motor, a locking device within the hood for locking the latter, a plurality of motor controlling devices arranged within the hood and connected with different members of the motor for rendering the latter ineffective, a rock shaft within the hood and connected with the said motor controlling devices, an operating means controlled by an operator and connected with the said shaft and with the said hood locking device, a locking slide within the hood and having an aperture, the slide being connected with the said rock shaft, and a permutation lock for locking the said several devices in operative position, a spring-pressed locking bolt projecting through the dashboard of the vehicle and adapted to engage the aperture in the said slide, a bearing fixed on the dashboard for the bolt to slide in, a locking frame mounted on the dashboard and pivotally connected with the said bearing, a locking link adapted to engage the said bolt to move the latter into locking position, a locking arm on which the said link is pivoted and pivoted on the said bearing, the said locking arm being adapted to engage the said frame, a locking plate engaging the said locking link and mounted on the same frame, and tumblers adapted to lock the said locking plate.

6. In a motor driven vehicle, a motor, a hood enclosing the motor, a locking device within the hood for locking the latter, a plurality of motor controlling devices arranged within the hood and connected with different members of the motor for rendering the latter ineffective, a rock shaft within the hood and connected with the said motor controlling devices, an operating means controlled by an operator and connected with the said shaft and with the said hood locking device, the said operating means having a rod made in sections slidable one on the other, a spring interposed between the said sections, means limiting the sliding movement of the sections one relative to the other, and locking means controlled by an operator and connected with the said shaft and the said operating means to lock the shaft and operating means against movement after the hood locking device and the said plurality of motor controlling devices have been moved into operative position by the said operating means.

JOHN P. GERAGHTY.